(12) United States Patent
Xi et al.

(10) Patent No.: US 8,936,725 B2
(45) Date of Patent: Jan. 20, 2015

(54) ENGINEERED WETLAND DEVICE OF CONTINUOUS OPERATION FOR WASTEWATER TREATMENT UNDER LOW TEMPERATURE

(75) Inventors: Beidou Xi, Beijing (CN); Lieyu Zhang, Beijing (CN); Jixi Gao, Nanjing (CN); Jinbiao Wang, Beijing (CN); Xunfeng Xia, Beijing (CN); Qigong Xu, Beijing (CN)

(73) Assignee: Chinese Research Academy of Environmental Sciences, Beijing (CN)

( * ) Notice: Subject to any disclaimer, the term of this patent is extended or adjusted under 35 U.S.C. 154(b) by 401 days.

(21) Appl. No.: 13/491,124

(22) Filed: Jun. 7, 2012

(65) Prior Publication Data
US 2013/0175215 A1    Jul. 11, 2013

(30) Foreign Application Priority Data
Jan. 9, 2012    (CN) .......................... 2012 1 0004222

(51) Int. Cl.
*C02F 3/32*    (2006.01)
*C02F 3/00*    (2006.01)

(52) U.S. Cl.
USPC ........... 210/602; 210/603; 210/617; 210/151; 210/170.01

(58) Field of Classification Search
USPC ......... 210/601, 602, 603, 612, 615, 616, 617, 210/150, 151, 170.01, 252, 259
See application file for complete search history.

(56) References Cited

U.S. PATENT DOCUMENTS

| 8,252,182 B1 * | 8/2012 | Chang et al. .................. 210/602 |
| 2008/0142438 A1 * | 6/2008 | Kent ............................. 210/602 |

FOREIGN PATENT DOCUMENTS

| CN | 201882979 U | 6/2011 |
| CN | 102145956 A | 8/2011 |
| CN | 201952328 A | 8/2011 |
| CN | 102260021 A | 11/2011 |
| JP | 2005-74407 A | 3/2005 |

OTHER PUBLICATIONS

Shi—he Wang et al., "Study on the Operating Characteristics of Subsurface Flow Constructed Wetland," China Water & Wastewater, vol. 19, No. 4, pp. 9-11 (2003).
Huan Shen et al., "Study on Enhanced Measures for Operation of Subsurface Flow Constructed Wetlands in Winter," China Water & Wastewater, vol. 23, No. 5, pp. 44-46 (Mar. 2007).
(Continued)

*Primary Examiner* — Fred Prince
(74) *Attorney, Agent, or Firm* — Pillsbury Winthrop Shaw Pittman LLP

(57) ABSTRACT

Constructed wetland wastewater treatment equipment under low temperature for continuous operation which includes: three-section substrates filled in a constructed wetland, ventilation pipes being arranged in the substrates, a height of a bed of the constructed wetland being higher than a height of the substrates; a double wall being filled with an organic substance used as a barrier at periphery of the constructed wetland; a water distributing pipe disposed at a top of the three-section substrates and a water collecting pipe disposed at a bottom of the three-section substrates; and a water inlet pipe connected to an upper portion at one end of the three-section substrates and a water outlet pipe connected to a lower portion at the other end of the three-section substrates, a water outlet of the water outlet pipe being higher than the height of the bed of the constructed wetland.

21 Claims, 2 Drawing Sheets

(56) References Cited

OTHER PUBLICATIONS

S. Wallace et al., "Cold Climate Wetlands: Design & Performance," 7th International Conference on Wetland Systems for Water Pollution Control, Lake Buena Vista, Florida, 14 pages (Nov. 11-16, 2000).

Office Action as issued for Chinese Patent Application No. 201210004222.1, dated Apr. 11, 2013.
Office Action as issued for Chinese Patent Application No. 201210004222.1, dated Jul. 25, 2013.

* cited by examiner

US 8,936,725 B2

ENGINEERED WETLAND DEVICE OF CONTINUOUS OPERATION FOR WASTEWATER TREATMENT UNDER LOW TEMPERATURE

CROSS-REFERENCE TO RELATED APPLICATION

This application claims the benefit of Chinese Patent Application No. 201210004222.1, filed on Jan. 9, 2012 in the State Intellectual Property Office of China, the disclosure of which is incorporated herein by reference in its entirety.

BACKGROUND OF THE INVENTION

1. Field of the Invention

The present invention relates to a heat preservation and temperature increasing equipment, and in particular, to a constructed wetland wastewater treatment equipment under low temperature for continuous operation.

2. Description of the Related Art

Environment, especially temperature, prominently influences removal efficiency of contaminants by constructed wetlands. Shihe Wang et al have found that a removal rate of TP (total phosphorus) by the constructed wetlands in winter is about 15% lower than a removal rate of TP by the constructed wetlands in summer. HuanShen et al have found in a demonstration project, in which scenic water body is purified by a subsurface flow type constructed wetland, that mean removal rates of TP and TN (total nitrogen) by the winter wetlands are 34% and 27% lower than those of TP and TN by the summer wetlands, respectively. Wallace et al considers that an over-low temperature not only affects an effect of contamination treatment by the constructed wetlands, but also may cause several disadvantageous effects, such as, freezing of a substrate layer, low concentration of the bed, pipe fracture and so on, thereby restricting application of the constructed wetlands in winter in cold regions. The current studies of wetland heat preservation drop behind since various methods cannot produce desirable effect.

SUMMARY OF THE INVENTION

An object of the present invention is to provide constructed wetland wastewater treatment equipment under low temperature for continuous operation to improve a high removal rate of nitrogen and phosphor, stabilization for a treatment effect, and recycle of wastes. Further, the constructed wetland wastewater treatment equipment has a flow transformable function to ensure the constructed wetland operates continuously and stably.

To achieve the above object, the constructed wetland wastewater treatment equipment under low temperature for continuous operation according to the present invention includes:

three-section substrates being vertically filled and parallel to each other in a constructed wetland, ventilation pipes being arranged in the substrates;

a height of a bed of the constructed wetland being higher than a height of the substrates;

a double wall used as a barrier at a periphery of the constructed wetland, an organic substance being filled inside the double wall to perform a ferment heat generation, a top of the double wall being opened or sealed;

a gas transfer pipe disposed at the top of the double wall when the top is sealed, the gas transfer pipe being connected to a water head tank of which a water pipe is connected to the constructed wetland;

a water distributing pipe disposed at a top of the three-section substrates and a water collecting pipe disposed at a bottom of the three-section substrates, a water outlet of the water collecting pipe being higher than the height of the bed of the constructed wetland; and a water inlet pipe connected to an upper portion at one end of the three-section substrates and a water outlet pipe connected to a lower portion at the other end of the three-section substrates, a water outlet of the water outlet pipe being higher than the height of the bed of the constructed wetland;

the constructed wetland wastewater treatment equipment being characterized in that the water distributing pipe and the water inlet pipe are respectively connected to the water head tank;

the water inlet pipe and the water outlet pipe are closed when the water enters the water distributing pipe, the water is discharged through the highest water outlet of the water collecting pipe, and the water is adjusted to be discharged through a middle water outlet after a heat preservation layer composed of an ice layer and an air layer is formed;

the water distributing pipe and the water collecting pipe at the bottom are closed when the water enters the water inlet pipe, the water is discharged through the highest water outlet of the water outlet pipe, and the water is adjusted to be discharged through the middle water outlet after the heat preservation layer composed of the ice layer and the air layer is formed; and the adjustment through the pipes for distributing the water is capable of making a mutual transform between a horizontal flow wetland and a vertical flow wetland.

The substrates of the constructed wetland wastewater treatment equipment are a combination of one or more of zeolite, gravel, limestone, slag, active carbon.

An upper section of substrates connected with the water inlet pipe can be approximately 10%-approximately 20% in length of a total length of the three-section substrates. A middle section of substrates can be approximately 70%-approximately 85% in length of the total length. A lower section of substrates connected with the water outlet pipe can be approximately 5%-approximately 10% in length of the total length.

The height of the substrates can be between and/or are approximately 1.6-approximately 1.8 m, and the height of the bed can be between and/or are approximately 2.2-approximately 2.5 m.

In the three-section substrates, particle diameters of the upper section of substrates connected with the water inlet pipe and the lower section of substrates connected with the water outlet pipe both can be between and/or are approximately 16-approximately 32 mm, and a particle diameter of the middle section of substrates can be between and/or are approximately 8-approximately 16 mm.

The water distributing pipe and the water inlet pipe are connected to the water head tank by respective water inlet valves. The water collecting pipe and the water outlet pipe are provided with respective main control valves and respective sub-control valves at different heights.

Each of the water collecting pipe and the water outlet pipe is provided with three sub-control valves which are respectively mounted at a position higher than the height of the bed of the constructed wetland, in the middle of the substrates, and at the bottom of the bed of the constructed wetland.

The water distributing pipe and the water collecting pipe can both be made of a PVC pipe. The diameters of the water distributing pipe and water collecting pipe can be between and/or are approximately 100 mm to approximately 200 mm. The water distributing pipe uniformly distributes the water, apertures are arranged on the water distributing pipe at an interval of approximately 10-approximately 20 cm and a diameter of each of the apertures can be approximately 1-approximately 3 cm. The water collecting pipe is provided with water collecting apertures corresponding to the middle section of substrates. The water collecting apertures can be arranged on the water collecting pipe at an interval of approximately 5-approximately 10 cm and a diameter of each of the water collecting apertures can be approximately 1-approximately 3 cm.

The upper layer of the constructed wetland can be planted with emerged plants having strong decontamination.

A leakage-proof layer can be coated at the bottom inside of the double wall.

Another object of this invention provides constructed wetland wastewater treatment equipment under a low temperature for continuous operation, including:

three-section substrates vertically filled and parallel to each other in a constructed wetland, ventilation pipes being arranged in the substrates;

a height of a bed of the constructed wetland being higher than a height of the substrates;

a double wall used as a barrier at a periphery of the constructed wetland, an organic substance being filled inside the double wall to perform a ferment heat generation, a top of the double wall being opened;

a water distributing pipe disposed at a top of the three-section substrates and a water collecting pipe disposed at a bottom of the three-section substrates, a water outlet of the water collecting pipe being higher than the height of the bed of the constructed wetland; and a water inlet pipe connected to an upper portion at one end of the three-section substrates and a water outlet pipe connected to a lower portion at the other end of the three-section substrates, a water outlet of the water outlet pipe being higher than the height of the bed of the constructed wetland;

the water distributing pipe and the water inlet pipe being respectively connected to a water head tank with a water pipe that is connected to the constructed wetland;

wherein the water inlet pipe and the water outlet pipe are closed when water enters the water distributing pipe, the water is discharged through the water outlet of the water collecting pipe, and the water is adjusted to be discharged through a middle water outlet after a heat preservation layer composed of an ice layer and an air layer is formed on the constructed wetland;

wherein the water distributing pipe and the water collecting pipe at the bottom are closed when the water enters the water inlet pipe, the water is discharged through the water outlet of the water outlet pipe, and the water is adjusted to be discharged through the middle water outlet after the heat preservation layer composed of the ice layer and the air layer is formed; and the adjustment of the pipes for distributing the water is capable of making a mutual transform between a horizontal flow wetland and a vertical flow wetland.

Both of the herein described embodiments of engineered wetlands are flow transformable wetlands that can mutually transform the horizontal flow wetland and the vertical flow wetland therebetween by adjusting distributing pipes based on the change of the ambient temperature. This overcomes disadvantages that dissolved oxygen of incoming water is low in the horizontal flow wetland in summer and a thermal loss is much in the vertical flow wetland in winter. Thereby, the operating mode of the wetland can be flexibly adjusted in winter. Further, the influence of the ambient temperature on the wetland is relieved by forming the heat preservation layer composed of the ice layer and the air layer, and the wetland can achieve a continuous heat preservation and temperature increase by a heat generated by metabolization of microorganism in the double wall, thereby ensuring the constructed wetland to continuously and stably operate under the low temperature. The flow transformable wetland has advantages of mutual transformation between the vertical flow wetland and the horizontal flow wetland, washing a matrix with water flowing in different directions, having a high organic substance decomposing effect and so on. Thus, the blocking problem can be relieved and even overcome. The present invention can be applied widely in large-scale, middle-scale and small-scale constructed wetlands to preserve temperature in winter. Therefore, the present invention has features of operating without pollution, easily operating, saving costs, having a low operating cost, achieving a good heat preservation effect, circulating resources, having a strong processing ability, stably operating and so on.

The present invention effectively combines the horizontal flow wetland and the vertical flow wetland so that the operating mode of the wetland can be flexibly adjusted in winter. The water temperature in the wetland is substantially not affected by the ambient temperature by using the ice layer and an insulating air layer in a heat preservation manner insulating from the heat generated by metabolization of microorganism in the double wall, thereby ensuring the constructed wetland to endure the entire winter.

DETAILED DESCRIPTION OF THE EMBODIMENTS

Figure 1:
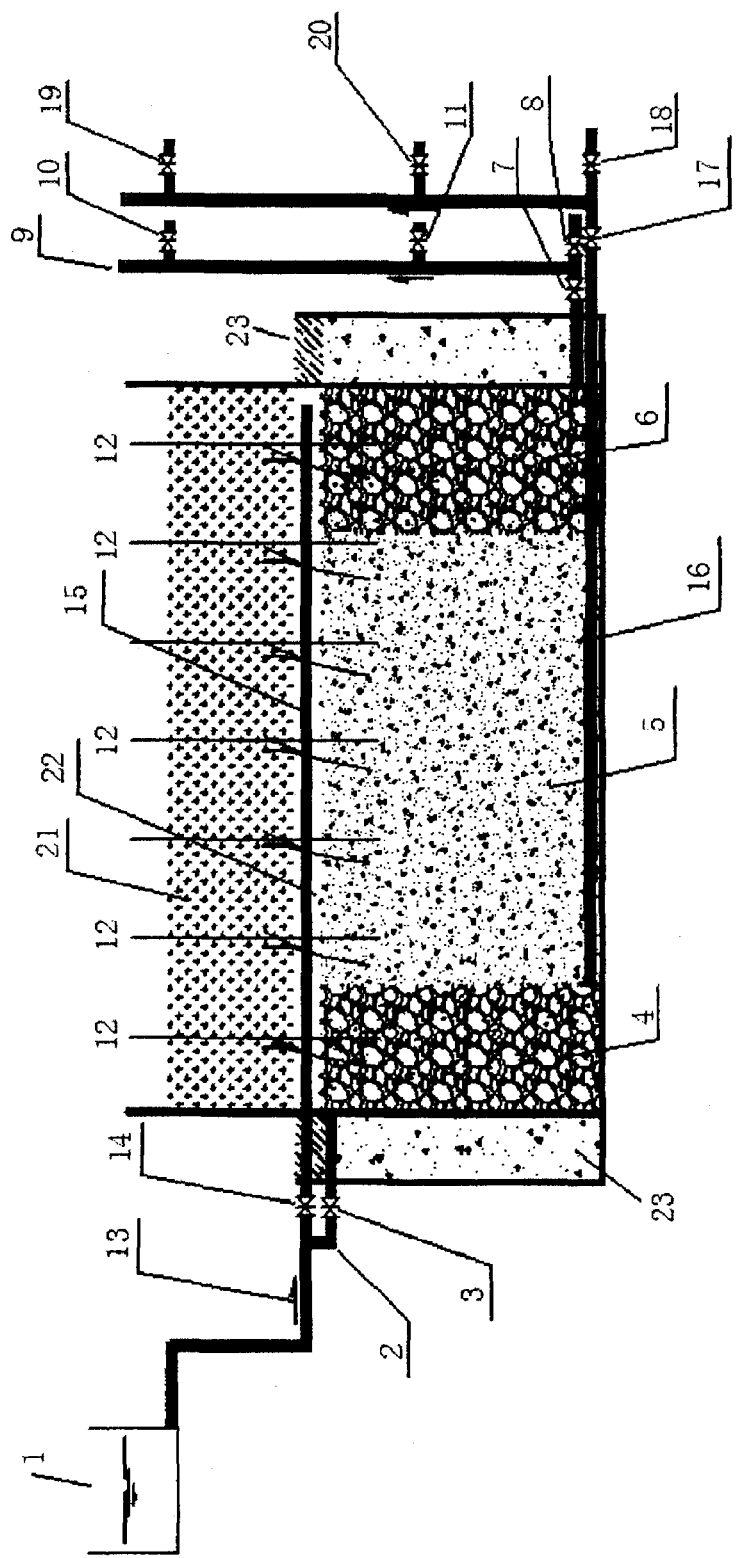
FIG. 1 is a schematically structural section view according to the present invention in which a double wall is an aerobic fermentation heat generation structure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Figure 2:
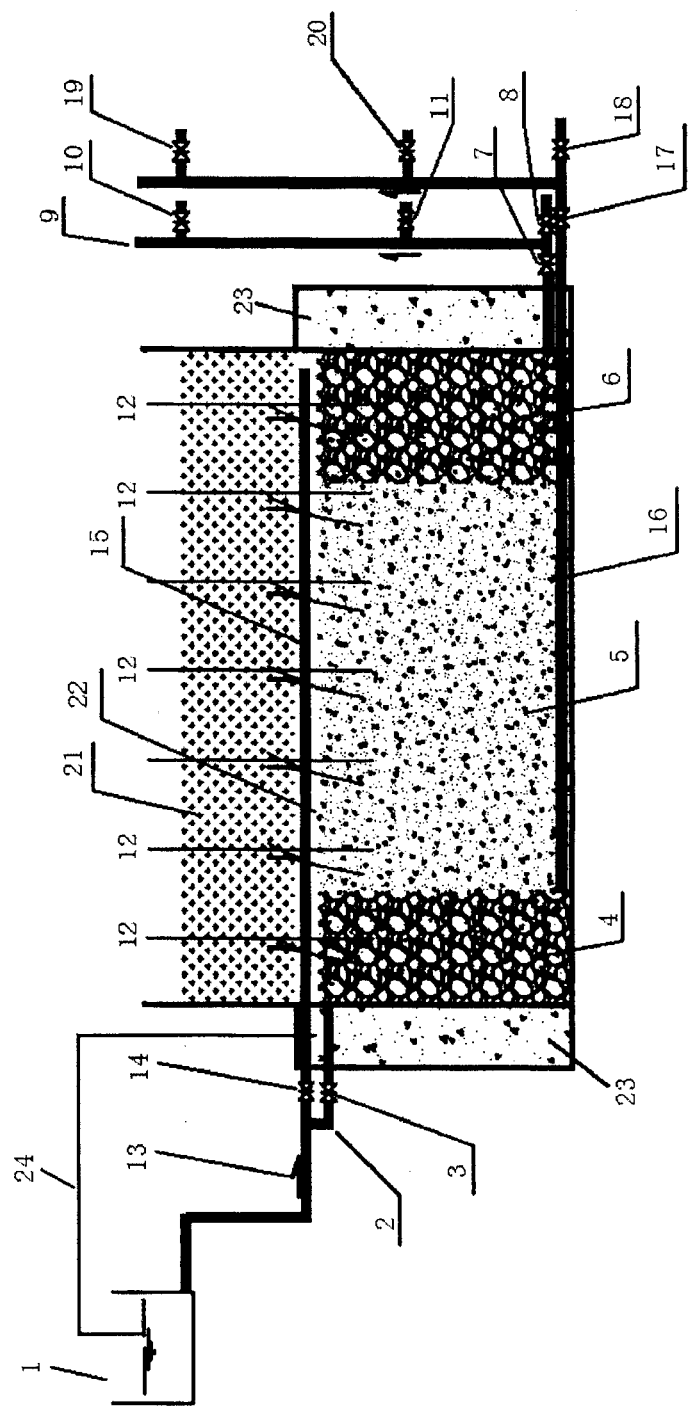
FIG. 2 is a schematically structural section view according to the present invention in which a double wall is an anaerobic fermentation heat generation structure.

With reference to FIGS. 1 and 2, they are schematically detailed structural views according to embodiments of the present invention.

It is noted that the terms used in the present invention, such as "left", "right", "upper", "down" and the like, employ the direction shown in FIGS. 1 and 2 as a reference basis, unless additionally stated. Such terms and directions are not meant to be limiting.

Also, where the numeric values herein are indicated as "approximate" or "approximately," it should be appreciated that in another embodiment a strict adherence to the numerical values (as to any one specific value, or all of the values) is also set forth herein.

A water head tank 1 discharges wastewater to be treated into a constructed wetland respectively by an upper water inlet pipe 2 and a top water distributing pipe 15 adjacent to or at a top end or upper portion of the constructed wetland.

Substrates with different particle diameters are vertically filled and parallel to each other in the constructed wetland. In an embodiment, the constructed wetland comprises three-section substrates that are vertically filled and parallel to each other. For example, as shown in FIGS. 1 and 2, the inside of the constructed wetland is divided into an upper (left) section 4, a middle section 5, and a lower (right) section 6. The substrates of the present invention may be zeolite, gravel, limestone, slag, active carbon and the like, and a combination of various substrates. The limestone is described simply by way of an example in the following context. Specifically, in one embodiment, particle diameters of limestone substrates in the upper (left) and lower (right) sections 4, 6 are both between and/or are approximately 16-approximately 32 mm. In an embodiment, a particle diameter of limestone substrate in the middle section 5 is between and/or are approximately 8-approximately 16 mm.

The constructed wetland comprises the water inlet pipe 2 and the water distributing pipe 15, and a water outlet pipe 9 and a water collecting pipe 16, which are respectively controlled to introduce and discharge water by respective water inlet control valves and water outlet control valves. The water inlet pipe 2 can be connected adjacent to, in, or at an upper portion at one end (e.g., top) of the three-section substrates and the water outlet pipe 9 can be connected to a lower portion adjacent to, in, or at the other (opposite) end (e.g., bottom) of the three-section substrates. Specifically, in the illustrated embodiment, a top water inlet pipe 13 of the water head tank 1 and the upper (left) section 4 of the constructed wetland are connected fluidly with the water inlet pipe 2 by an upper water inlet valve 3. The top water inlet pipe 13 is also connected with the water distributing pipe 15 by a top water inlet valve 14. The water distributing pipe 15 can extend across a top end of the bed of the constructed wetland, i.e., across the three sections 4-6.

The water outlet pipe 9 is mounted adjacent to in, or near a lower portion of the lower (right) section 6 on the other side of the constructed wetland. A main control valve 7 and sub-control valves 8, 10, 11 are mounted on the water outlet pipe 9.

The water collecting pipe 16 is mounted in a bottom layer of the constructed wetland. The water collecting pipe 16 can extend across a bottom end of the bed of the constructed wetland, i.e., across the three sections 4-6. A main control valve 17 and sub-control valves 18, 19, 20 are mounted on the water collecting pipe 16.

A water outlet of the water outlet pipe 9 and the water collecting pipe 16 is higher than a height of the bed of the constructed wetland (e.g., measured from the bottom of the bed below water collecting pipe to the top). The highest sub-control valves 10 (19) of the sub-control valves 8, 10, 11 (18, 19, 20) are located at a higher position than the height of the bed of the constructed wetland. The lowest sub-control valves 8 (18) of the sub-control valves 8, 10, 11 (18, 19, 20) are located at the bottom of the constructed wetland. The middle sub-control valves 11 (20) of the sub-control valves 8, 10, 11 (18, 19, 20) are located at a middle position of the limestone substrates.

For example, in one embodiment, the sub-control valves are respectively designed to be located to have distances of approximately 2.4 m (the sub-control valves 10, 19), approximately 1.3 m (the sub-control valves 11, 20), and approximately 0.1 m (the sub-control valves 8, 18) from the bottom layer of the bed in order to adjust water levels of the wetland cells. In one embodiment, the height of the substrates in the constructed wetland is approximately 1.6-approximately 1.8 m and the height of the bed is approximately 2.2-approximately 2.5 m. In another embodiment, the sub-control valves can be provided at the above-noted distances in combination with the above-noted heights of substrates and height of the bed.

A barrier at periphery of the constructed wetland has a structure of a double wall 23 in which a substantially uniformly mixed mixture (e.g., of dejecta, bulrush and activated sludge) is filled. The barrier can be filled with one or more organic substances, for example.

A leakage-proof layer can lie at a bottom inside of the double wall 23 to prevent a percolate generated by ferment of the mixture 23 of, for example, dejecta, bulrush and activated sludge, and/or other materials, from infiltrating underground to pollute ground water.

The constructed wetland wastewater treatment equipment according to the present invention can operate in the winter as described below, for example.

A top of the double wall 23 is opened as shown in FIG. 1. The materials (e.g., bulrush, dejecta and activated sludge) are crushed by a crusher and/or other equipment and then substantially uniformly mixed. As generally known in the art, water content of the mixture of bulrush, dejecta and activated sludge can be adjusted by adding water. Accordingly, such technology is not described in further detail.

In an embodiment, a height of the mixture is at least slightly higher than the height of the limestone substrates in the constructed wetland. In an embodiment, the mixture leaves a height of approximately 0.2 m at intervals of approximately 1-approximately 2 m to form ventilation slots which have the same height as that of the mixture. In an embodiment, the bulrush with a thickness of approximately 0.1-approximately 0.2 m covers over the mixture to achieve a heat preservation effect.

The main control valve 7 of the the water outlet pipe 9 and the upper water inlet valve 3 of the water inlet pipe 2 are closed, and the top water inlet valve 14 is opened when the constructed wetland is a vertical down flow wetland. The top water inlet pipe 13 begins to substantially uniformly distribute the water through the water distributing pipe 15. Meanwhile, the main control valve 17 and the sub-control valve 19 of the water collecting pipe 16 at the bottom layer of the constructed wetland are opened so that the water level rises. For example, in an embodiment, the water level can rise to approximately 2.4 m. The water collecting pipe 16 discharges the water (e.g., the water collecting pipe 16 of the present invention can be opened by a water aperture at a position corresponding to the substrates in the middle section to enhance fluidity of the water flow in the constructed wetland) after water in the upper water level is frozen (e.g., generally frozen with a thickness of approximately 0.4-approximately 0.6 m). The sub-control valve 19 is then closed and the sub-control valve 18 is opened to rapidly lower the water level. When the operating water level of the wetland is reduced (e.g., to approximately 2.0 m), the sub-control valve 18 is closed and the water outlet valve 20 is opened to discharge the water to the operating water level, thereby forming a heat preservation layer composed of an ice layer 21 and an air layer 22 in the constructed wetland. At that time, top ventilation pipes 12 are opened to ensure concentration of dissolved oxygen under the ice.

The top water inlet valve 14 and the main control valve 17 of the water collecting pipe 16 are closed, and the upper water inlet valve 3 and the main control valve 7 and the sub-control valve 10 of the water outlet pipe 9 are opened, when the constructed wetland is a horizontal flow. At that time, water begins to enter the water inlet pipe 2 so that the water level rises. For example, in an embodiment, the water level can rise to approximately 2.4 m. The water outlet pipe 9 discharges the water, the sub-control valve 10 is closed and the sub-control valve 8 is opened so as to rapidly lower the water level, after the upper water level is frozen (e.g., generally frozen with a thickness of approximately 0.4-approximately 0.6 m). When the operating water level of the wetland is reduced (e.g., to approximately 2.0 m), the sub-control valve 8 is closed and the water outlet valve 11 is opened to discharge the water to the operating water level, thereby forming the heat preservation layer composed of the ice layer 21 and the air layer 22. At that time, top ventilation pipes 12 are opened to ensure concentration of dissolved oxygen under the ice.

The vertical flow and the horizontal flow can be mutually transformed. The transforming period can depend on specific conditions. For example, the vertical flow can operate in the early winter and the horizontal flow can operate in the severe winter.

The equipment of the present invention may be started in the late autumn and continuously operate throughout in the entire winter. The equipment collects products deriving from heat generation as an organic fertilizer used in a farmland after the heat generation is completed.

The double wall 23 is under a sealed state in FIG. 2. An anaerobic environment is formed inside the double wall 23 to facilitate to compatibility and metabolic heat generation of anaerobic microorganisms.

As described above, for example, the bulrush, dejecta and activated sludge and/or other materials are crushed by the crusher and then uniformly mixed. The water content of the mixture of bulrush, dejecta and activated sludge is adjusted by adding the water (this is known technology and thus is not described in detail). In an embodiment, a height of the mixture is slightly higher than the height of the limestone substrates in the constructed wetland.

The top of the double wall 23 is sealed and a gas transfer pipe 24 is arranged at the top thereof. A produced marsh gas enters the water head tank 1 through the gas transfer pipe 24 to thus ensure the anaerobic environment inside the double wall 23.

The main control valve 7 of the the water outlet pipe 9 and the upper water inlet valve 3 of the water inlet pipe 3 are closed, and the top water inlet valve 14 is opened when the constructed wetland is a vertical down flow wetland. The top water inlet pipe 13 begins to substantially uniformly distribute the water through the water distributing pipe 15. Meanwhile, the main control valve 17 and the sub-control valve 19 of the water collecting pipe 16 at the bottom layer of the constructed wetland are opened so that the water level rises. For example, in an embodiment, the water level rises to approximately 2.4 m. The water collecting pipe 16 discharges the water (e.g., the water collecting pipe 16 of the present invention can be opened by a water aperture at a position corresponding to the substrates in the middle section to enhance fluidity of the water flow in the constructed wetland) after water in the upper water level is frozen (e.g., generally froze with a thickness of approximately 0.4-approximately 0.6 m). The sub-control valve 19 is then closed and the sub-control valve 18 is opened to rapidly lower the water level. When the operating water level of the wetland is reduced (e.g., to approximately 2.0 m), the sub-control valve 18 is closed and the water outlet valve 20 is opened to discharge the water to the operating water level, thereby forming the heat preservation layer composed of the ice layer 21 and the air layer 22 in the constructed wetland. At that time, top ventilation pipes 12 are opened to ensure concentration of dissolved oxygen under the ice.

The top water inlet valve 14 and the main control valve 17 of the water collecting pipe 16 are closed, and the upper water inlet valve 3 and the main control valve 7 and the sub-control valve 10 of the water outlet pipe 9 are opened, when the constructed wetland is a horizontal flow. At that time, the water begins to enter the water inlet pipe 2 so that the water level rises. For example, in an embodiment, the water level can rise to approximately 2.4 m. The water outlet pipe 9 discharges the water, the sub-control valve 10 is closed and the sub-control valve 8 is opened so as to rapidly lower the water level, after the upper water level is froze to approximately 0.4-approximately 0.6 m. When the operating water level of the wetland is reduced to approximately 2.0 m, the sub-control valve 8 is closed and the water outlet valve 11 is opened to discharge the water to the operating water level, thereby forming the heat preservation layer composed of the ice layer 21 and the air layer 22. At that time, the top ventilation pipes 12 are opened to ensure concentration of dissolved oxygen under the ice.

The vertical flow and the horizontal flow can be mutually transformed. The transforming period can depend on specific conditions. For example, the vertical flow can operate in the early winter and the horizontal flow can operate in the severe winter.

In another embodiment, the equipment of the present invention in either FIG. 1 or FIG. 2 can be started in the late autumn and continuously operate in the entire winter, for example. The equipment can collect products deriving from heat generation as an organic fertilizer used in a farmland after the heat generation is completed, for example.

Accordingly, both of the herein described embodiments of engineered wetlands are flow transformable wetlands that can mutually transform the horizontal flow wetland and the vertical flow wetland therebetween by adjusting distributing pipes based on the change of the ambient temperature. This overcomes disadvantages that dissolved oxygen of incoming water is low in the horizontal flow wetland in summer and a thermal loss is much in the vertical flow wetland in winter. Thereby, the operating mode of the wetland can be flexibly adjusted in winter. Further, the influence of the ambient temperature on the wetland is relieved by forming the heat preservation layer composed of the ice layer and the air layer, and the wetland can achieve a continuous heat preservation and temperature increase by a heat generated by metabolization of microorganism in the double wall, thereby ensuring the constructed wetland to continuously and stably operate under the low temperature. The flow transformable wetland has advantages of mutual transformation between the vertical flow wetland and the horizontal flow wetland, washing a matrix with water flowing in different directions, having a high organic substance decomposing effect and so on. Thus, the blocking problem can be relieved and even overcome. The present invention can be applied widely in large-scale, middle-scale and small-scale constructed wetlands to preserve temperature in winter. Therefore, the present invention has features of operating without pollution, easily operating, saving costs, having a low operating cost, achieving a good heat preservation effect, circulating resources, having a strong processing ability, stably operating and so on.

The present invention effectively combines the horizontal flow wetland and the vertical flow wetland so that the operating mode of the wetland can be flexibly adjusted in winter. The water temperature in the wetland is substantially not affected by the ambient temperature by using the ice layer and an insulating air layer in a heat preservation manner insulating from the heat generated by metabolization of microorganism in the double wall, thereby ensuring the constructed wetland to endure the entire winter.

While the principles of the invention have been made clear in the illustrative embodiments set forth above, it will be apparent to those skilled in the art that various modifications may be made to the structure, arrangement, proportion, elements, materials, and components used in the practice of the invention.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. Constructed wetland wastewater treatment equipment under a low temperature for continuous operation, comprising:
    three-section substrates vertically filled and parallel to each other in a constructed wetland, ventilation pipes being arranged in the substrates;
    a height of a bed of the constructed wetland being higher than a height of the substrates;
    a double wall used as a barrier at a periphery of the constructed wetland, an organic substance being filled inside the double wall to perform a ferment heat generation, a top of the double wall being sealed;
    a gas transfer pipe disposed at the top of the double wall when the top is sealed by an ice layer, the gas transfer pipe being connected to a water head tank of which a water pipe is connected to the constructed wetland;
    a water distributing pipe disposed at a top of the three-section substrates and a water collecting pipe disposed at a bottom of the three-section substrates, a water outlet of the water collecting pipe being higher than the height of the bed of the constructed wetland; and
    a water inlet pipe connected to an upper portion at one end of the three-section substrates and a water outlet pipe connected to a lower portion at the other end of the three-section substrates, a water outlet of the water outlet pipe being higher than the height of the bed of the constructed wetland;
    the water distributing pipe and the water inlet pipe being respectively connected to the water head tank;
    wherein the water inlet pipe and the water outlet pipe are closed when water enters the water distributing pipe, the water is discharged through the water outlet of the water collecting pipe, and the water is adjusted to be discharged through a middle water outlet after a heat preservation layer composed of the ice layer and an air layer is formed on the constructed wetland;
    wherein the water distributing pipe and the water collecting pipe at the bottom are closed when the water enters the water inlet pipe, the water is discharged through the water outlet of the water outlet pipe, and the water is adjusted to be discharged through the middle water outlet after the heat preservation layer composed of the ice layer and the air layer is formed; and
    the adjustment of the pipes for distributing the water is capable of making a mutual transform between a horizontal flow wetland and a vertical flow wetland.

2. The constructed wetland wastewater treatment equipment of claim 1, wherein the substrates are a combination of one or more of: zeolite, gravel, limestone, slag, and active carbon.

3. The constructed wetland wastewater treatment equipment of claim 1, wherein an upper section of substrates connected with the water inlet pipe is approximately 10%-approximately 20% in length of a total length of the three-section substrates, a middle section of substrates is approximately 70%-approximately 85% in length of the total length, and a lower section of substrates connected with the water outlet pipe is approximately 5%-approximately 10% in length of the total length.

4. The constructed wetland wastewater treatment equipment of claim 1, wherein the height of the substrates is approximately 1.6-approximately 1.8 m, and the height of the bed is approximately 2.2-approximately 2.5 m.

5. The constructed wetland wastewater treatment equipment of claim 1, wherein in the three-section substrates, particle diameters of an upper section of substrates connected with the water inlet pipe and a lower section of substrates connected with the water outlet pipe are both approximately 16 approximately 32 mm, and a particle diameter of a middle section of substrates is approximately 8-approximately 16 mm.

6. The constructed wetland wastewater treatment equipment of claim 1, wherein
    the water distributing pipe and the water inlet pipe are connected to the water head tank by respective water inlet valves; and
    the water collecting pipe and the water outlet pipe are provided with respective main control valves and respective sub-control valves at different heights.

7. The constructed wetland wastewater treatment equipment of claim 6, wherein each of the water collecting pipe and the water outlet pipe is provided with three sub-control valves which are respectively mounted at a position higher than the height of the bed of the constructed wetland, in the middle of the substrates, and at the bottom of the bed of the constructed wetland.

8. The constructed wetland wastewater treatment equipment of claim 1, wherein the water distributing pipe and the water collecting pipe are both made of a PVC pipe with diameters of approximately 100 mm to approximately 200 mm and configured to substantially uniformly distributes the water, wherein apertures are arranged on the water distributing pipe at an interval of approximately 10-approximately 20 cm, a diameter of each of the apertures is approximately 1-approximately 3 cm, wherein the water collecting pipe is provided with water collecting apertures corresponding to the middle section of substrates and wherein the water collecting apertures are arranged on the water collecting pipe at an interval of approximately 5-approximately 10 cm, and a diameter of each of the water collecting apertures is approximately 1-approximately 3 cm.

9. The constructed wetland wastewater treatment equipment of claim 1, wherein the upper portion of the constructed wetland is planted with emerged plants having strong decontamination.

10. The constructed wetland wastewater treatment equipment of claim 1, wherein a leakage-proof layer is coated at the bottom inside of the double wall.

11. Constructed wetland wastewater treatment equipment under a low temperature for continuous operation, comprising:
    three-section substrates vertically filled and parallel to each other in a constructed wetland, ventilation pipes being arranged in the substrates;
    a height of a bed of the constructed wetland being higher than a height of the substrates;

a double wall used as a barrier at a periphery of the constructed wetland, an organic substance being filled inside the double wall to perform a ferment heat generation, a top of the double wall being opened;

a water distributing pipe disposed at a top of the three-section substrates and a water collecting pipe disposed at a bottom of the three-section substrates, a water outlet of the water collecting pipe being higher than the height of the bed of the constructed wetland; and a water inlet pipe connected to an upper portion at one end of the three-section substrates and a water outlet pipe connected to a lower portion at the other end of the three-section substrates, a water outlet of the water outlet pipe being higher than the height of the bed of the constructed wetland;

the water distributing pipe and the water inlet pipe being respectively connected to a water head tank with a water pipe that is connected to the constructed wetland;

wherein the water inlet pipe and the water outlet pipe are closed when water enters the water distributing pipe, the water is discharged through the water outlet of the water collecting pipe, and the water is adjusted to be discharged through a middle water outlet after a heat preservation layer composed of an ice layer and an air layer is formed on the constructed wetland;

wherein the water distributing pipe and the water collecting pipe at the bottom are closed when the water enters the water inlet pipe, the water is discharged through the water outlet of the water outlet pipe, and the water is adjusted to be discharged through the middle water outlet after the heat preservation layer composed of the ice layer and the air layer is formed; and the adjustment of the pipes for distributing the water is capable of making a mutual transform between a horizontal flow wetland and a vertical flow wetland.

12. The constructed wetland wastewater treatment equipment of claim 11, wherein the substrates are a combination of one or more of: zeolite, gravel, limestone, slag, and active carbon.

13. The constructed wetland wastewater treatment equipment of claim 11, wherein an upper section of substrates connected with the water inlet pipe is approximately 10%-approximately 20% in length of a total length of the three-section substrates, a middle section of substrates is approximately 70%-approximately 85% in length of the total length, and a lower section of substrates connected with the water outlet pipe is approximately 5%-approximately 10% in length of the total length.

14. The constructed wetland wastewater treatment equipment of claim 11, wherein the height of the substrates is approximately 1.6-approximately 1.8 m, and the height of the bed is approximately 2.2-approximately 2.5 m.

15. The constructed wetland wastewater treatment equipment of claim 11, wherein in the three-section substrates, particle diameters of an upper section of substrates connected with the water inlet pipe and a lower section of substrates connected with the water outlet pipe are both approximately 16 approximately 32 mm, and a particle diameter of a middle section of substrates is approximately 8-approximately 16 mm.

16. The constructed wetland wastewater treatment equipment of claim 11, wherein the water distributing pipe and the water inlet pipe are connected to the water head tank by respective water inlet valves; and the water collecting pipe and the water outlet pipe are provided with respective main control valves and respective sub-control valves at different heights.

17. The constructed wetland wastewater treatment equipment of claim 16, wherein each of the water collecting pipe and the water outlet pipe is provided with three sub-control valves which are respectively mounted at a position higher than the height of the bed of the constructed wetland, in the middle of the substrates, and at the bottom of the bed of the constructed wetland.

18. The constructed wetland wastewater treatment equipment of claim 11, wherein the water distributing pipe and the water collecting pipe are both made of a PVC pipe with diameters of approximately 100 mm to approximately 200 mm and configured to substantially uniformly distributes the water, wherein apertures are arranged on the water distributing pipe at an interval of approximately 10-approximately 20 cm, a diameter of each of the apertures is approximately 1-approximately 3 cm, wherein the water collecting pipe is provided with water collecting apertures corresponding to the middle section of substrates and wherein the water collecting apertures are arranged on the water collecting pipe at an interval of approximately 5-approximately 10 cm, and a diameter of each of the water collecting apertures is approximately 1-approximately 3 cm.

19. The constructed wetland wastewater treatment equipment of claim 11, wherein the upper portion of the constructed wetland is planted with emerged plants having strong decontamination.

20. The constructed wetland wastewater treatment equipment of claim 11, wherein a leakage-proof layer is coated at the bottom inside of the double wall.

21. A method for using wastewater treatment equipment in a constructed wetland under a lower temperature for continuous operation to make a mutual transform between a horizontal flow wetland and a vertical flow wetland, the constructed wetland comprising three-section substrates vertically filled and parallel to each other in a constructed wetland, ventilation pipes being arranged in the substrates; a height of a bed of the constructed wetland being higher than a height of the substrates; a double wall used as a barrier at a periphery of the constructed wetland, an organic substance being filled inside the double wall to perform a ferment heat generation; a water distributing pipe disposed at a top of the three-section substrates and a water collecting pipe disposed at a bottom of the three-section substrates, a water outlet of the water collecting pipe being higher than the height of the bed of the constructed wetland; and a water inlet pipe connected to an upper portion at one end of the three-section substrates and a water outlet pipe connected to a lower portion at the other end of the three-section substrates, a water outlet of the water outlet pipe being higher than the height of the bed of the constructed wetland, the water distributing pipe and the water inlet pipe being respectively connected to a water head tank with a water pipe that is connected to the constructed wetland; the method comprising:

closing the water inlet pipe and the water outlet pipe when water enters the water distributing pipe such that the water is discharged through the water outlet of the water collecting pipe, and the water is adjusted to be discharged through a middle water outlet after a heat preservation layer composed of an ice layer and an air layer is formed on the constructed wetland; and closing the water distributing pipe and the water collecting pipe at the bottom when the water enters the water inlet pipe such that the water is discharged through the water outlet of the water outlet pipe, and the water is adjusted to be discharged through the middle water outlet after the heat preservation layer composed of the ice layer and the air layer is formed;

wherein the adjustment of the pipes for distributing the water is capable of making a mutual transform between a horizontal flow wetland and a vertical flow wetland.

\* \* \* \* \*